US011892714B2

(12) United States Patent
Chalberg, Jr.

(10) Patent No.: US 11,892,714 B2
(45) Date of Patent: Feb. 6, 2024

(54) USING BINOCULAR RIVALRY FOR EXPANDING COLOR PERCEPTION

(71) Applicant: WAVESHIFT LLC, Palo Alto, CA (US)

(72) Inventor: Thomas W. Chalberg, Jr., Palo Alto, CA (US)

(73) Assignee: WaveShift LLC, Palo Alto, CA (US)

( * ) Notice: Subject to any disclaimer, the term of this patent is extended or adjusted under 35 U.S.C. 154(b) by 60 days.

(21) Appl. No.: 17/571,150

(22) Filed: Jan. 7, 2022

(65) Prior Publication Data

US 2022/0397778 A1   Dec. 15, 2022

Related U.S. Application Data

(63) Continuation of application No. 16/494,919, filed as application No. PCT/US2018/022964 on Mar. 16, 2018, now Pat. No. 11,221,501.

(Continued)

(51) Int. Cl.
*G02C 7/10* (2006.01)
*G02B 1/04* (2006.01)
(Continued)

(52) U.S. Cl.
CPC ............. *G02C 7/104* (2013.01); *G02B 1/043* (2013.01); *G02B 5/22* (2013.01); *G02C 7/04* (2013.01); *G02C 2202/16* (2013.01)

(58) Field of Classification Search
CPC ...... G02C 7/104; G02C 7/04; G02C 2202/16; G02B 1/043; G02B 5/22
(Continued)

(56) References Cited

U.S. PATENT DOCUMENTS

| 5,218,386 A | 6/1993 | Levien |
| 5,408,278 A * | 4/1995 | Christman ........... H04N 13/334 351/159.63 |

(Continued)

FOREIGN PATENT DOCUMENTS

| TW | 2015/05617 | 2/2015 |
| WO | WO 2015/184299 | 12/2015 |
| WO | WO 2016/148984 | 9/2016 |

OTHER PUBLICATIONS

Bowman, K.J. "A Method For Quantitative Scoring of the Farnsworth Panel D-15." Acta Ophthalmology, Dec. 1982, 60(6): 906-916.
(Continued)

*Primary Examiner* — William R Alexander
(74) *Attorney, Agent, or Firm* — Fish & Richardson P.C.

(57) ABSTRACT

An article includes a first ophthalmic lens including a first spectral filter (e.g., a reflective or absorptive spectral filter), and a second ophthalmic lens including a second spectral filter (e.g., a reflective or absorptive spectral filter). The first spectral filter substantially blocks visible light having wavelengths corresponding to a first portion of a spectral sensitivity range of a first type of cone (e.g., S, M, or L cone) and substantially passes visible light having wavelengths in a second, non-overlapping portion of the spectral sensitivity range. The second spectral filter substantially blocks visible light having wavelengths in the second portion of the spectral sensitivity range and substantially passes visible light having wavelengths in the first spectral sensitivity range.

18 Claims, 11 Drawing Sheets

Related U.S. Application Data (60) Provisional application No. 62/490,803, filed on Apr. 27, 2017, provisional application No. 62/473,250, filed on Mar. 17, 2017.

(51) Int. Cl.
    *G02B 5/22*     (2006.01)
    *G02C 7/04*     (2006.01)

(58) Field of Classification Search
    USPC .................................................... 351/159.6
    See application file for complete search history.

(56) References Cited

U.S. PATENT DOCUMENTS

| | | | |
|---|---|---|---|
| 5,774,202 A | 6/1998 | Abraham et al. | |
| 10,054,803 B2 | 8/2018 | Wold et al. | |
| 10,338,286 B2 | 7/2019 | Schmeder et al. | |
| 10,852,461 B2 | 12/2020 | Schmeder et al. | |
| 10,912,457 B2 | 2/2021 | Schmeder | |
| 10,962,855 B2 * | 3/2021 | Schowengerdt | G02F 1/13306 |
| 11,221,501 B2 | 1/2022 | Chalberg, Jr. | |
| 11,300,844 B2 * | 4/2022 | Schowengerdt | G02B 6/0076 |
| 2003/0210378 A1 * | 11/2003 | Riza | A61B 3/066 |
| | | | 351/205 |
| 2014/0233105 A1 | 8/2014 | Schmeder et al. | |
| 2015/0338683 A1 | 11/2015 | Perricone et al. | |
| 2018/0095202 A1 | 4/2018 | Schmeder et al. | |
| 2018/0098694 A1 | 4/2018 | Schmeder | |
| 2018/0239147 A1 * | 8/2018 | Schowengerdt | G02B 6/0076 |
| 2021/0240018 A1 * | 8/2021 | Schowengerdt | G02B 6/0026 |

OTHER PUBLICATIONS

International Preliminary Report on Patentability received in International Patent Application No. PCT/US2018/022964, dated Sep. 17, 2019, 5 pages.

International Search Report and Written Opinion received in International Patent Application No. PCT/US2018/022964, dated Jun. 14, 2018, 6 pages.

Vingrys, A. et al. "A Quantitative Scoring Technique for Panel Tests of Color Vision." Investigative Ophthalmology and Visual Science, Jan. 1988. 29(1): 50-63.

* cited by examiner

USING BINOCULAR RIVALRY FOR EXPANDING COLOR PERCEPTION

CROSS-REFERENCE TO RELATED APPLICATIONS

This application is a continuation of U.S. application Ser. No. 16/494,919, filed on Sep. 17, 2019, which is a national stage application filed under 35 U.S.C. 371, of PCT Application No. PCT/US2018/022964, filed on Mar. 16, 2018, which claims priority to U.S. Application No. 62/490,803, filed on Apr. 27, 2017 and U.S. Application No. 62/473,250, filed on Mar. 17, 2017. The disclosures of the prior applications are considered part of and are incorporated by reference in the disclosure of this application.

BACKGROUND

A human eye detects light through rods and cones located in the retina. Rods are photoreceptors that are sensitive to low level of light, but do not discriminate between colors. Cones are photoreceptors with color pigments that selectively transmits a certain spectrum of the incoming light. Cones are one of the three types: S-cones, M-cones, and L-cones. S-cones, where S stands for short, have peak responsivity around 420 nm. M-cones, where M stands for medium, have peak responsivity around 530 nm. L-cones, where L stands for long, have peak responsivity around 570 nm.

The human visual system perceives color by processing the differences in the stimulation of the three types of cones. For example, yellow is perceived when an image formed on the retina stimulates L-cones more than the M-cones, as L-cones have a peak responsivity around 570 nm that falls within the interval of wavelength (560 nm-590 nm) that a person typically associates with color yellow. In another example, green is perceived when the image formed on the retina stimulates M-cones more than S- or L-cones, as M-cone has peak responsivity around 530 nm that falls in between 520 nm-560 nm corresponding to green.

Color blindness is a decreased ability to see color or distinguish colors in a human vision. It ranges in its severity, ranging from a general lack of color vision ('monochromatism'), to a malfunction of one of the three types of cones ('dichromacy'), to an anomalous spectral sensitivity in one or more pigments of a cone that results in decreased ability to differentiate between pairs of colors. Protanomaly, for example, occurs in a person who is missing or has malfunctioning L-cones. Deuteranomaly occurs where the person has missing or malfunctioning M-cones. Tritanomaly is caused by missing or malfunctioning S-cone.

SUMMARY

In general, in a first aspect, the invention features an article that includes a first ophthalmic lens including a first spectral filter (e.g., a reflective or absorptive spectral filter), and a second ophthalmic lens including a second spectral filter (e.g., a reflective or absorptive spectral filter). The first spectral filter substantially blocks visible light having wavelengths corresponding to a first portion of a spectral sensitivity range of a first type of cone (e.g., S, M, or L cone) and substantially passes visible light having wavelengths in a second, non-overlapping portion of the spectral sensitivity range. The second spectral filter substantially blocks visible light having wavelengths in the second portion of the spectral sensitivity range and substantially passes visible light having wavelengths in the first spectral sensitivity range.

Embodiments of the article can include one or more of the following features. For example, the article can be eyeglasses, a pair of contact lenses, goggles, or a pair of intraocular lenses.

In some embodiments, the first and second spectral filters are a low-pass filter and a high-pass filter, respectively. In certain cases, at least one of the first and second spectral filters is a notch filter.

At least one of (e.g., both of) the first and second spectral filters can substantially transmit visible light having wavelengths below 520 nm. In certain cases, both of the first and second spectral filters substantially transmits visible light having wavelengths below 520 nm.

First and second spectral filters can be implemented in various ways. For example, the first and second spectral filters can be reflective spectral filters. As another example, the first and second spectral filters are absorptive spectral filters.

In some embodiments, the first and second spectral filters are passive spectral filters.

In some embodiments, the first and second spectral filters dynamic spectral filters. In certain cases, the dynamic spectral filters each include an electro-optic element.

In some embodiments, at least the first ophthalmic lens further includes a filter array that includes the first spectral filter. In certain cases, the second ophthalmic lens further includes a filter array that includes the second spectral filter.

In some embodiments, a first transmission spectrum of the first spectral filter and a second transmission spectrum of the second spectral filter are configured to enhance the color perception of a dichromat.

In general, in a further aspect, the invention features a method of enhancing the color perception of a dichromat that includes providing the dichromat with the article of claim 1.

In some implementations, the dichromat is a protanope and the first type of cone corresponds to the M-cone. In certain cases, the dichromat is a deuteranope and the first type of cone is the L-cone. In certain cases, the dichromat is a tritanope and the first type of cone is the S-cone. The details of one or more embodiments of the invention are set forth in the accompanying drawings and the description below. Other features, objects, and advantages of the invention will be apparent from the description and drawings, and from the claims.

As used herein, "substantially blocks" and "substantially transmits" or "substantially passes" generally refers to a level of blocking and transmitting/passing of light that is perceptible to the human eye. Substantially blocking, for example, can include blocking of 90% or more (e.g., 95% or more, 98% or more, 99% or more) of the designated light from a receptor. Substantial transmission, for example, can include transmission of 50% or more (e.g., 75% or more, 90% or more, 95% or more) of the designated light to a receptor.

DESCRIPTION OF DRAWINGS

Like reference symbols in the various drawings indicate like elements.

DETAILED DESCRIPTION

Figure 1:
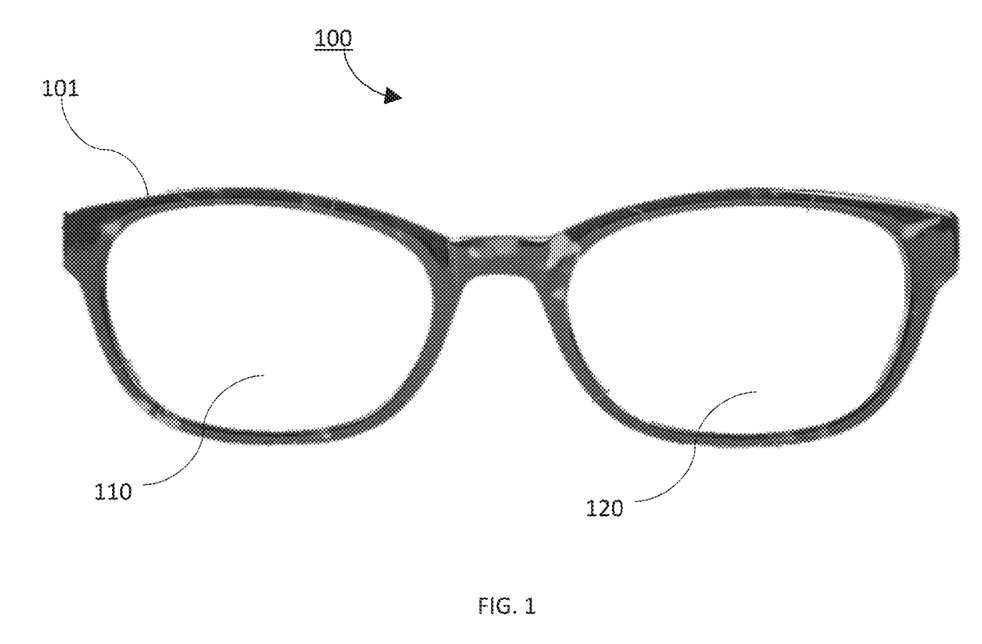
FIG. 1 shows a pair of eyeglasses that include spectral filters for enhancing color perception.

Referring to FIG. 1, a pair of color-perception enhancing eyeglasses 100 are disclosed which can enable a dichromatic person (a 'dichromat') to differentiate a third color. Eyeglasses 100 includes frames 101 and ophthalmic lenses 110 and 120. Each ophthalmic lens includes a different spectral filter. Eyeglasses 100 enhance the wearers color perception by using the concept of binocular rivalry. This works by spectrally-filtering light differently for each eye so that the same type of cone is responsive to different wavelengths in one eye versus the other. Specific examples of spectral filters are discussed below.

Binocular rivalry is a perceptual 'rivalry', or competition, that occurs when two different images are presented simultaneously to the two eyes. In such scenario, our visual perception initially suppresses one of the two images and makes the other image dominant. The perceptual dominance, however, switches after a few seconds and only the other image is 'seen' during this time. This rivalry continues on as long as the conflicting visual stimulus remains, switching between the images present at the two eyes every few seconds.

A binocular rivalry-like effect is believed to exist for colors. For example, when a green square is shown to the left eye while a blue square is shown to the right eye, the human visual system processes this information and perceives it as cyan resulting from mixing of green and blue, although the individual images are not in cyan. This type of effect can be used in enhancing human color perception.

Figure 2:
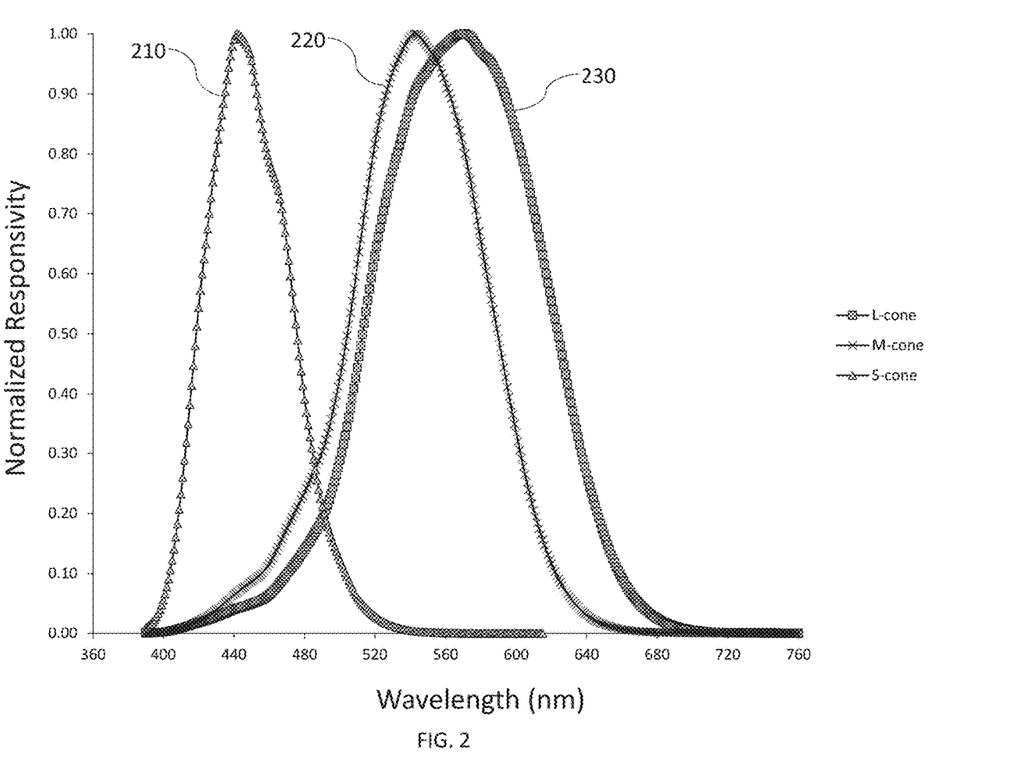
FIG. 2 shows peak-normalized spectral responsivity curves of S-, M-, and L-cones.

Normal human color perception is provided by presence of the three types of cones in each retina. FIG. 2 shows a plot of the peak-normalized spectral responsivity curves 210, 220 and 230 of the S-, M-, and L-cones, respectively. The S-cones have peak sensitivity at approximately 440 nm. The M-cones have peak sensitivity at approximately 550 nm, and the L-cones have peak sensitivity at approximately 570 nm. These three cones correspond approximately to the three principle color components of human color perception. A malfunction or omission of any one of these three cones results in decreased ability to perceive colors, as is the case for dichromats. It is believed, however, that the dimensionality of a dichromat's color vision can be improved by providing different spectral filtering to each eye.

A protanope has difficulty perceiving the difference between green and red due to lack of L-cone functionality, which is responsible for perception of red in a trichromat. An appropriate set of filters can be applied to protanope's eyes to create a difference in effective spectral responsivity curve of the M-cone between the left and the right eye, potentially enhancing his or her color perception. For a protanope, one filtering strategy is to effectively make the M-cone in one eye sensitive only to the shorter wavelengths of the M-cone, such as wavelengths below 550 nm (call this 'new' cone an M'-cone), and M-cone in the other eye sensitive only to the longer wavelengths of the M-cone, such as wavelengths above 550 nm (call this 'new' cone a L'-cone). In this scenario, one eye now has S- and M'-cones, and the other eye has L'-cone. When the two images from the eyes are processed by the human visual system, it is believed that one is able to distinguish colors that he or she otherwise cannot with just the S- and M-cones. While selecting a filter for modifying M-cone responsivity, it is important to maintain the integrity of S-cone's responsivity in at least one eye to preserve blue color perception. The integrity of the S-cone's responsivity can be maintained by ensuring that the filter configuration has a passband over spectral responsivity curve 210.

Figure 3:
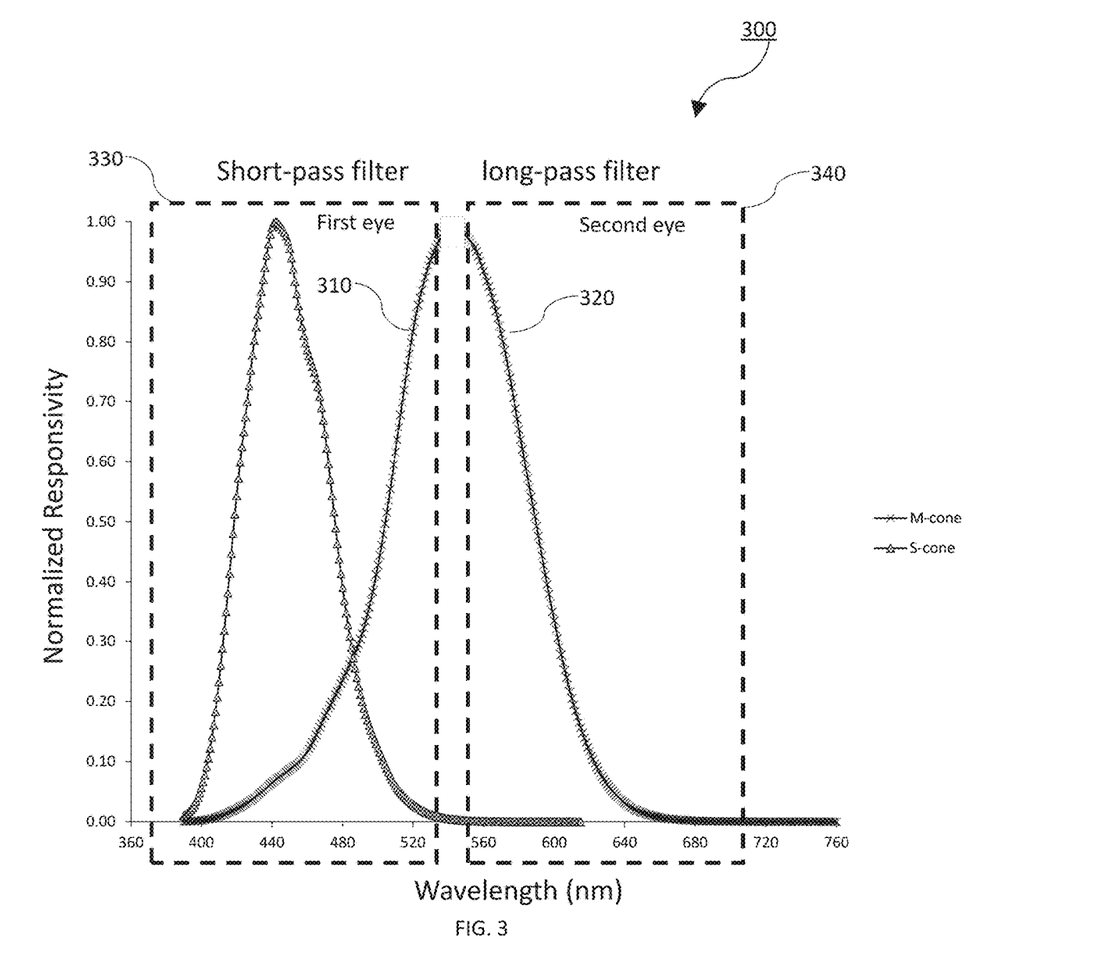
FIG. 3 shows an example of effective spectral responsivity curves of S- and M-cones as modified by color-perception enhancing lens designed for a protanope.

An example of filter transmission characteristics desirable for a protanope can be achieved by the following. Referring to FIG. 3, plot 300 shows portions of normalized responsivity curves 210 and 220 of the S- and M-cone from FIG. 2, but omits normalized responsivity of L-cone 230, as a protanope does not have functioning L-cones. The objective is to create a third responsivity curve from that of the two cones, wherein the resulting peaks of the three curves are separated from each other. Such filtering can be achieved by using a short-pass filter 330 for one eye with its transmission window marked by the labeled dotted box, which passes wavelength shorter than a cutoff wavelength. The eyeglasses include a long-pass filter 340 for the other eye, with its transmission window marked by the labeled dotted box, which passes wavelength longer than a cutoff wavelength. By selecting a short-pass filter with a cutoff wavelength around the peak responsivity of an M-cone and placing it in front of one eye, the filter modifies the effective spectral responsivity of the M-cone, turning it into a M'-cone with modified responsivity curve 310. By selecting a long-pass filter with a cutoff wavelength slightly longer than the cutoff wavelength of the short-pass filter 330 and placing it in front of the other eye, the filter modifies the effective spectral responsivity of the M-cone, turning it into a L'-cone with modified responsivity curve 320. Therefore, eyeglasses featuring the filters effectively create M'- and L'-cones in the respective eyes by performing a differential spectral filtering between the two eyes.

A consideration in filter selection is in peak separation of the resulting M' and L' cone responsivities. The human visual system is typically only able to discern a difference in color when a separation of wavelength between two colors is greater than 2-3 nm. Therefore, the short-pass and the long-pass filters should be selected such that the resulting peaks of the responsivities is separated by more than 2-3 nm (e.g., by 3 nm or more, 5 nm or more, 8 nm or more, 10 nm more, 12 nm or more, 15 nm or more, such as about 20 nm). Generally, "peak separation" refers to the wavelength separation between the maximum sensitivity of the M' and L' cones. The filter transmission windows can be non-overlapping, touching, or overlapping to achieve this separation depending on the characteristics of the filters' transmission windows.

Another consideration is the loss in the passband of the filters. Filter passband loss should be minimized for improved absolute spectral responsivity of the wearer. Yet another consideration is the relative intensity of light entering the two eyes. Pupillary response, the dilation or constriction of pupil in response to changes in brightness, does not independently control each eye. Therefore, the condition of one eye receiving significantly less light than the other eye can cause excessive constriction of the former and excessive dilation of the latter, causing visual discomfort. Accordingly, filter design should attempt to minimize the difference in intensity of the filtered light entering the two eyes.

While the foregoing filter combination is describing for enhancing color perception of a protanope, other implementations are also possible. For example, a deuteranope also has difficulty perceiving the difference between green and red caused by lack of M-cone functionality, which is responsible for perception of green in a trichromat. Similar to a protanope, an appropriate set of filters can be applied to deuteranope's eyes to create a difference in effective spectral responsivity of the L-cone between the left and the right eye. In this case, the strategy is to effectively make the L-cone in one eye sensitive only to the shorter wavelengths of the L-cone, and L-cone in the other eye sensitive only to the longer wavelengths of the L-cone.

Figure 4:
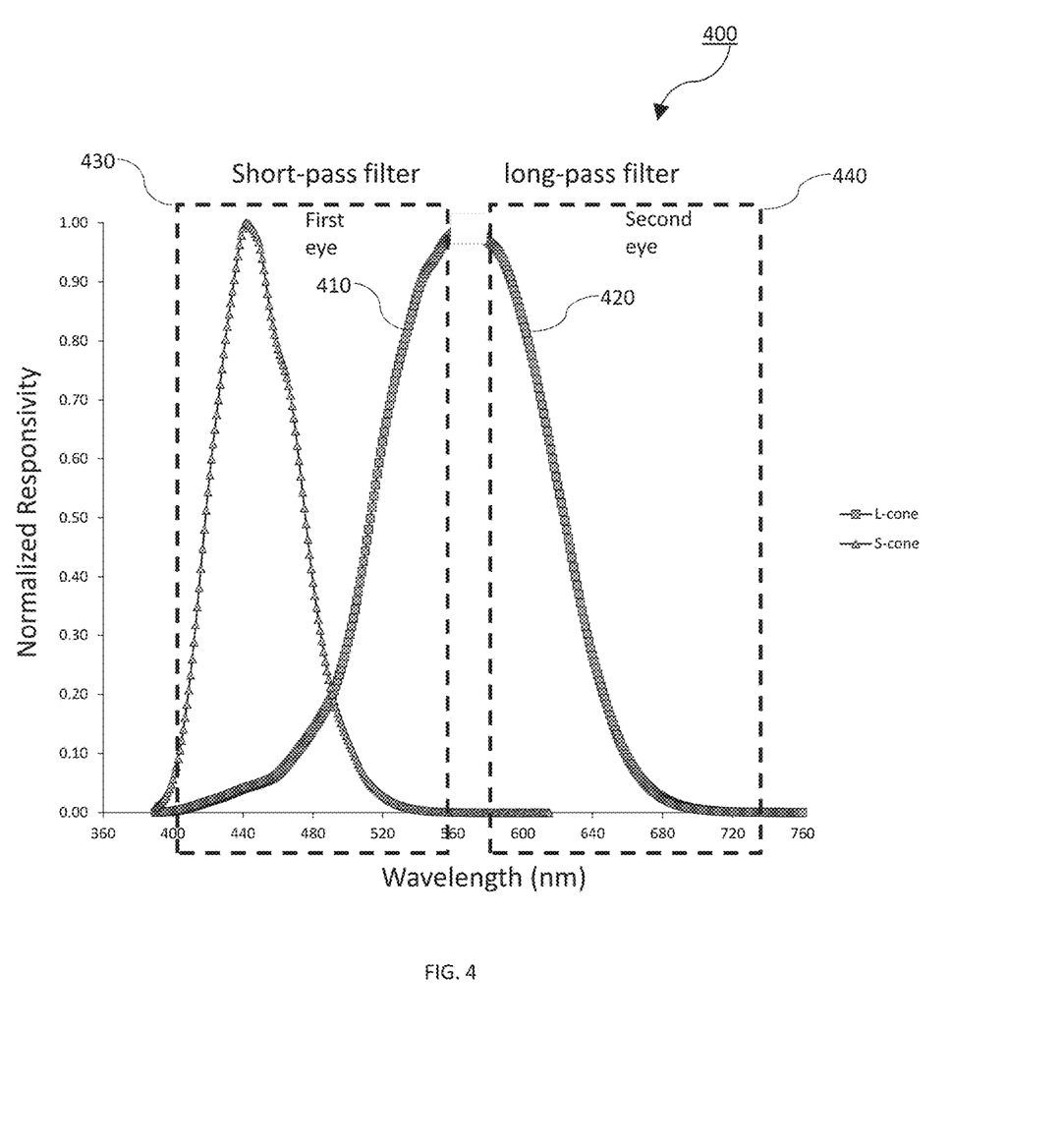
FIG. 4 shows an example of effective spectral responsivity curves of S- and L-cones as modified by color-perception enhancing lens designed for a deuteranope.

An example of filter transmission characteristics desirable for a deuteranope can be achieved by the following. Referring to FIG. 4, plot 400 shows portions of normalized responsivity 210 and 230 of S- and L-cone from FIG. 2, but omits normalized responsivity of M-cone 220, as a deuteranope does not have functioning M-cones. The objective is again to create a third responsivity curve from that of the two cones, wherein the resulting peaks of the three curves are separated from each other. Such filtering can be achieved by using short-pass filter 430 with its transmission window marked by the labeled dotted box, which passes wavelength shorter than a cutoff wavelength, and long-pass filter 440 with its transmission window marked by the labeled dotted box, which passes wavelength longer than a cutoff wavelength. By selecting a short-pass filter with a cutoff wavelength around the peak responsivity of an L-cone and placing it in front of one eye, the filter modifies the effective spectral responsivity of the L-cone, turning it into a M'-cone with modified responsivity curve 410. By selecting a long-pass filter with a cutoff wavelength slightly longer than that of the short-pass filter 430 and placing it in front of the other eye, the filter modifies the effective spectral responsivity of its L-cone, turning it into a L'-cone with modified responsivity curve 420. Therefore, we have effectively created M'- and L'-cones in the respective eyes by performing a differential spectral filtering between the two eyes.

In some embodiments, the S-cone response is modified instead of the M- or L-cone response using a combination of filters. For example, the filter cutoff wavelength of approximately 440 nm can be selected.

In some other embodiments, notch filters are used instead of short- or long-pass filters. A notch filter attenuates light only within a specified wavelength range while passing through all other visible wavelengths within its operating window with little loss in intensity. Use of a notch filter offers an advantage over the short- and long-pass filter implementations above, which significantly reduces the responsivity of the S-cone in one of the eyes because the long-pass filter blocks the corresponding wavelengths. In contrast, eyeglasses 100 implemented using a notch filter allows the S-cone sensitivity to be retained in both eyes while creating new sets of cone responsivity from the L- or M-cones. In some embodiments for a protanope, referring to FIG. 5A, one filter is a notch filter with a rejection band of around 500-550 nm, resulting in creation of L'-cone with responsivity curve 510 by cutting off shorter wavelengths of the M-cone while retaining responsivity of the S-cone.

Figure 5A:
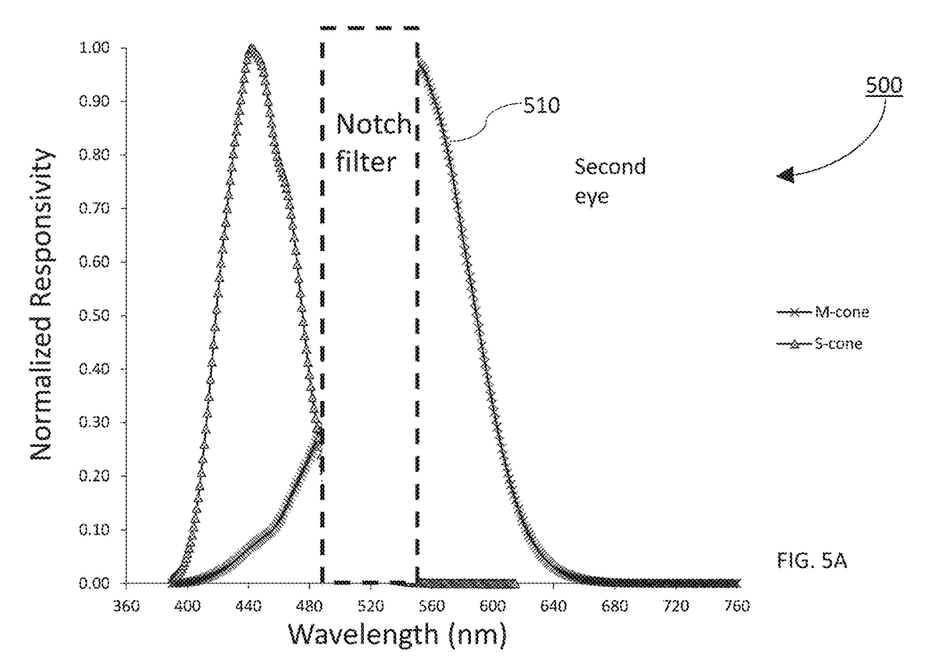
FIG. 5A-B show examples of effective spectral responsivity curves of S- and M-cones as modified by color-perception enhancing lens designed for a protanope using a notch filter.
Figure 5B:
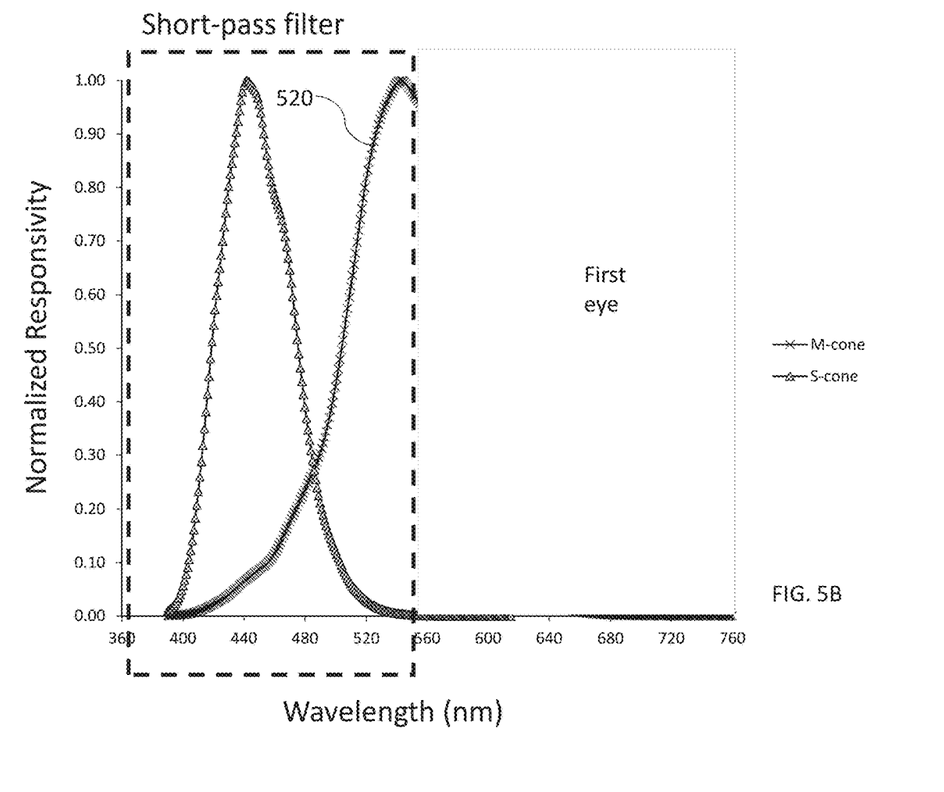

Referring to FIG. 5B, the other filter is a short-pass filter with a cutoff wavelength of around 550 nm, which leaves S-cone responsivity intact and creates M'-cone with responsivity curve 520 by cutting off the longer wavelengths of M-cone.

In some embodiments, the notch filter of FIG. 5A has a rejection band from 487 nm to 548 nm, and the short-pass filter of FIG. 5B has a cutoff wavelength of 539 nm.

Figure 6A:
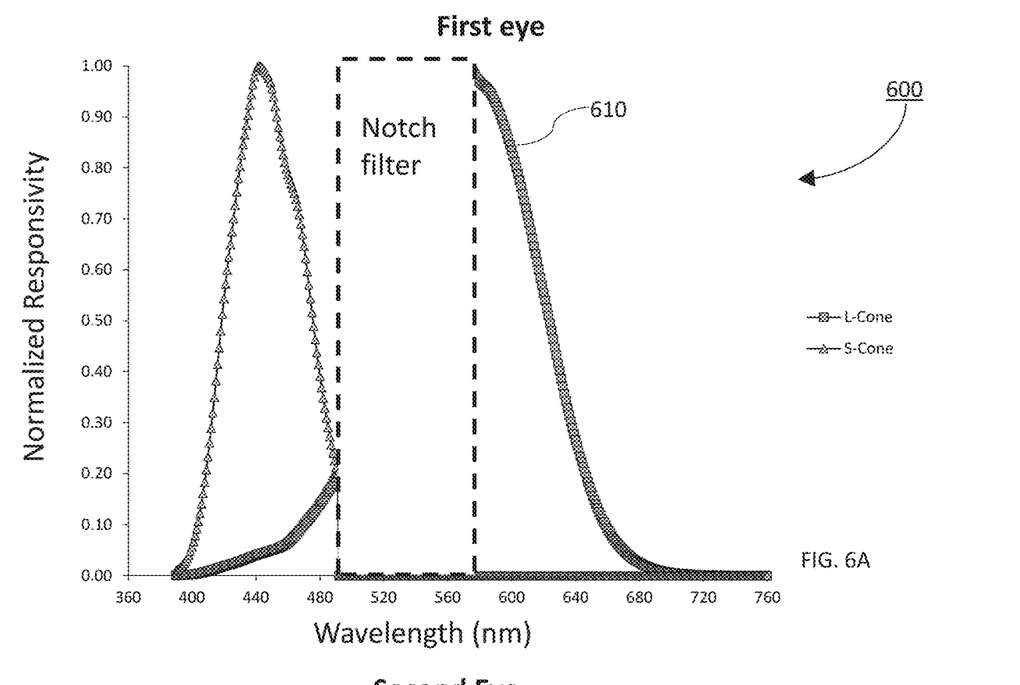
FIG. 6A-B show examples of effective spectral responsivity curves of S- and L-cones as modified by color-perception enhancing lens designed for a deuteranope using a notch filter.

In some embodiments, the combination of a notch filter and a short pass filter can be used to enhance the color perception of a deuteranope. Referring to FIG. 6A, the notch filter of the first eye has a rejection band between 470-590 nm, e.g., from 492 nm to 573 nm. The notch filter creates L'-cone with responsivity curve 610 by cutting off shorter wavelengths of the L-cone while retaining responsivity of the S-cone.

Figure 6B:
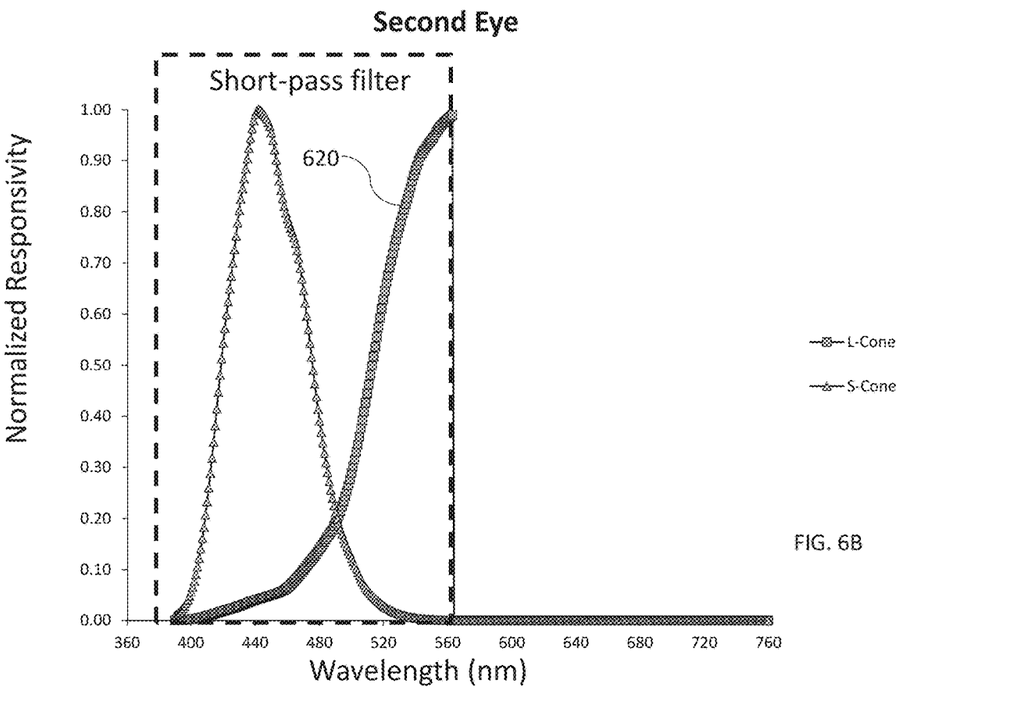

Referring to FIG. 6B, the short-pass filter can have a cutoff wavelength of around 550-600 nm, e.g., 564 nm. The short-pass filter leaves S-cone responsivity intact and creates an M'-cone with responsivity curve 620 by cutting off the longer wavelengths of L-cone.

A tritanope has difficulty perceiving the difference between blue and yellow caused by lack of S-cone functionality, which is responsible for perception of blue and violet in a trichromat. Similar to a protanope or a deuteranope, an appropriate set of filters can be applied to tritanope's eyes to create a difference in effective spectral responsivity of the L-cone between the left and the right eye. In this case, the strategy is to effectively make the L-cone in one eye sensitive only to the shorter wavelengths of the L-cone, and L-cone in the other eye sensitive only to the longer wavelengths of the L-cone while minimizing the change in responsivity of the M-cone.

Figure 7A:
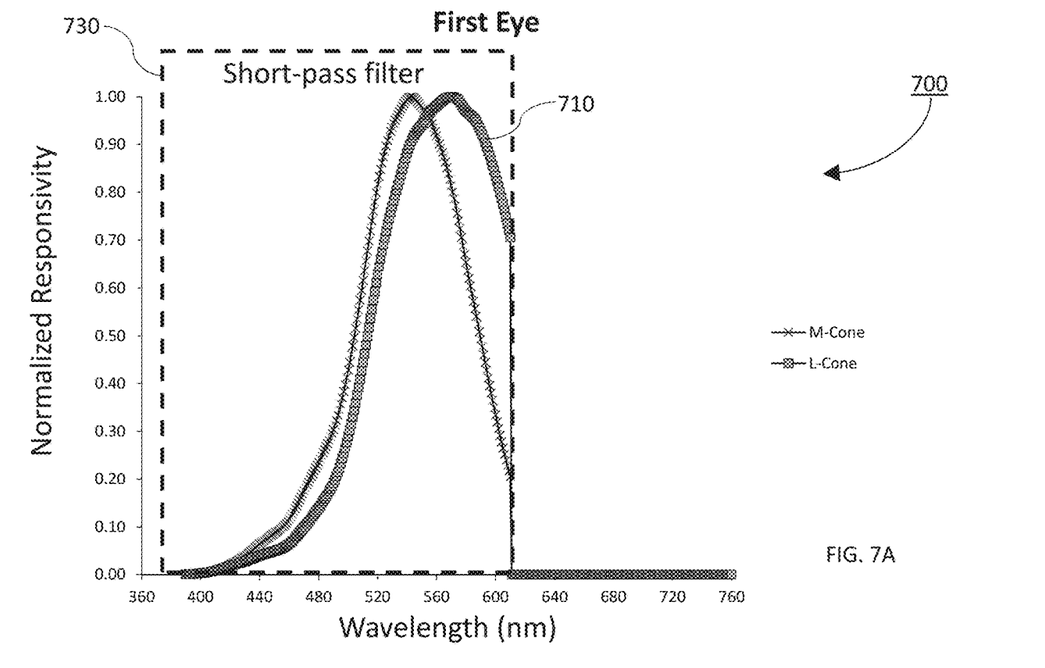
FIG. 7A-B show examples of effective spectral responsivity curves of M- and L-cones as modified by color-perception enhancing lens designed for a tritanope.
Figure 7B:
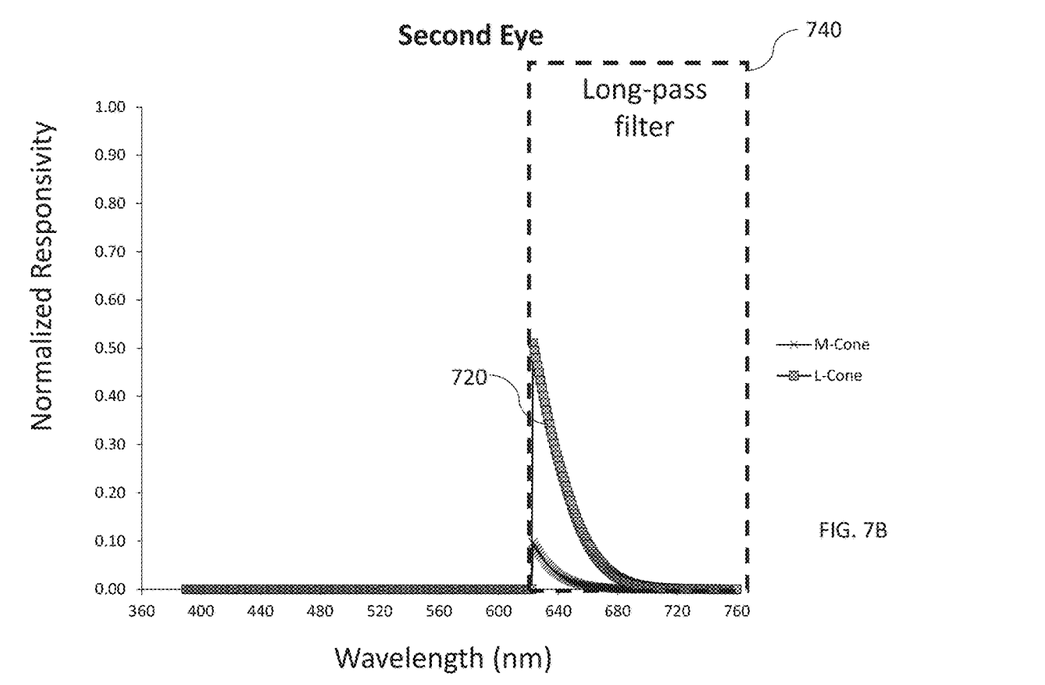

An example of filter transmission characteristics desirable for a tritanope can be achieved by the following. Referring to FIGS. 7A and 7B, plot 700 shows portions of normalized responsivity 220 and 230 of M- and L-cone from FIG. 2, but omits normalized responsivity of S-cone 210, as a tritanope does not have functioning S-cones. The objective is again to create a third responsivity curve from that of the two cones, wherein the resulting peaks of the three curves are separated from each other. Such filtering can be achieved by using short-pass filter 730 with its transmission window marked by the labeled dotted box, which passes wavelength shorter than a cutoff wavelength, and long-pass filter 740 with its transmission window marked by the labeled dotted box, which passes wavelength longer than a cutoff wavelength. By selecting a short-pass filter with a cutoff wavelength around 611 nm and placing it in front of the first eye, the filter modifies the effective spectral responsivity of the L-cone, turning it into a M'-cone with modified responsivity curve 710. By selecting a long-pass filter with a cutoff wavelength slightly longer than that of the short-pass filter 730 (e.g., 622 nm) and placing it in front of the second eye, the filter 730 modifies the effective spectral responsivity of its L-cone, turning it into an L'-cone with modified responsivity curve 720. In this example, the M-cone effectively functions as an S'-cone, as its peak wavelength is shorter than the M'- and the L'-cones. Therefore, we have effectively created S'-, M'- and L'-cones in the respective eyes by performing a differential spectral filtering between the two eyes.

While the foregoing discussion refers primarily to restoring a third cone-like perception to a dichromat, the techniques can be applied to a trichromat to further divide up the response of the S-cone into two different spectra, or alternatively the M or L cone. This can enable tetrachromacy, where two different spectral colors that appear the same (i.e., metamers) are distinguished by a human observer wearing appropriate color perception-enhancing glasses. In general, one or more of the user's three cones can be divided into two or more separate spectra over each eye so that a person could potentially perceive 6 or more different spectral bands instead of the normal 3.

Figure 8A:
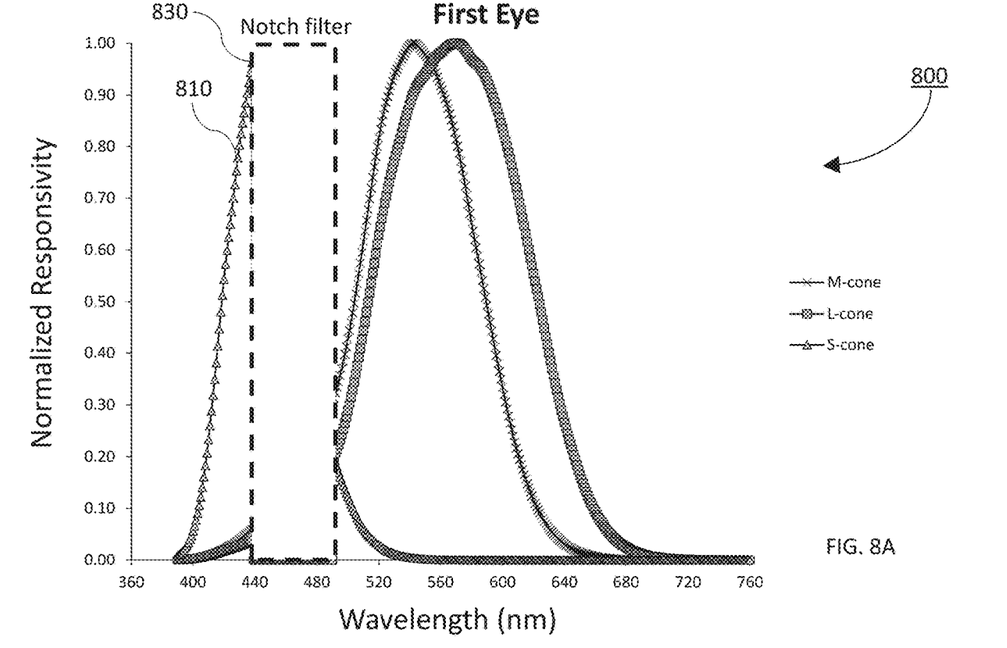
FIG. 8A-B show examples of effective spectral responsivity curves of S-, M-, and L-cones as modified by color-perception enhancing lens designed for a trichromat.

An example of filter transmission characteristics that can enable tetrachromacy can be achieved by the following. Referring to FIG. 8A, plot 800 shows portions of normalized responsivity 210, 220, and 230 of S-, M-, and L-cone from FIG. 2. Referring to FIG. 8A, the notch filter 830 of the first eye has a rejection band from around 439 nm to 490 nm. The notch filter creates a fourth-cone with responsivity curve 810 by cutting off longer wavelengths of the S-cone while retaining responsivity of the M- and the L-cone.

Figure 8B:
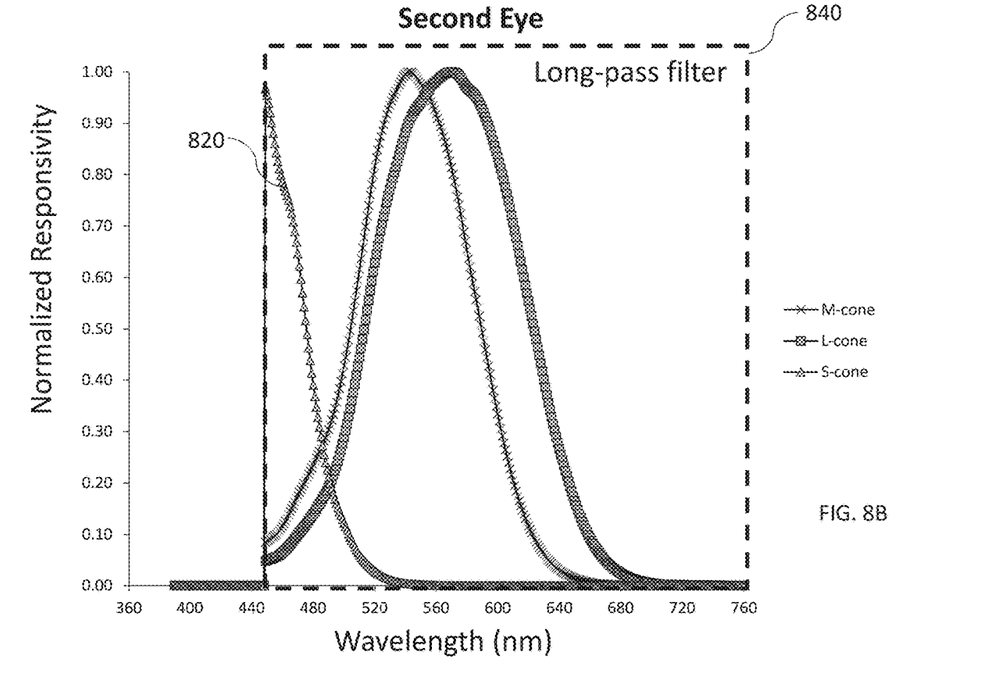

Referring to FIG. 8B, the long-pass filter 840 can have a cutoff wavelength near the lower cutoff of the notch filter 830, e.g., 448 nm. The long-pass leaves M- and L-cone responsivities intact and creates an S'-cone with responsivity curve 820 by cutting off the shorter wavelengths of the S-cone. Therefore, we have effectively created a fourth-cone and an S'-cone in addition to the original M- and L-cone in the respective eyes by performing a differential spectral filtering between the two eyes, potentially enabling tetrachromacy.

Various pairs of spectral filters for the first and second eyes of a user of the eyeglasses 100 have been discussed. A person typically has a visually dominant eye and a non-dominant eye. As such, various filters such as short-pass filters, long-pass filters, or notch filters may be assigned to a specific eye based on various considerations to improve visual perception of the user. For example, it may be advantageous to allow more light to enter the dominant eye relative to the non-dominant eye. As such, filters can be assigned such that light to the dominant-eye is attenuated to a lesser degree than the light to the non-dominant eye. Amount of attenuation may be compared, for example, based on the fraction of the visual spectrum being blocked by a filter. As another example, a notch filter may be assigned to the dominant eye, as notch filters typically filters out a smaller portions of the visible spectrum, resulting in more light reaching the dominant eye.

In general, a variety of different types of spectral filters can be used. In some embodiments, the spectral filters included with lenses 110 and 120 are dichroic filters. Generally, such filters can be formed from multilayer coatings deposited on a substrate (e.g., a glass or plastic substrate), such as a lens blank.

Other types of spectral filters can also be used. For example, in some embodiments, lenses 110 and 120 can include absorptive filters. Examples of absorptive filters are plastic or glass substrates impregnated with dyes, organic compounds, or inorganic compounds responsible for spectrum-sensitive absorption of light.

In certain embodiments, the spectral filtering is performed by adhesive laminate films including organic or inorganic films. Such films may provide spectral filtering through dichroic filtering (e.g., using a multilayer structure) or spectrum-sensitive absorption.

Figure 9:
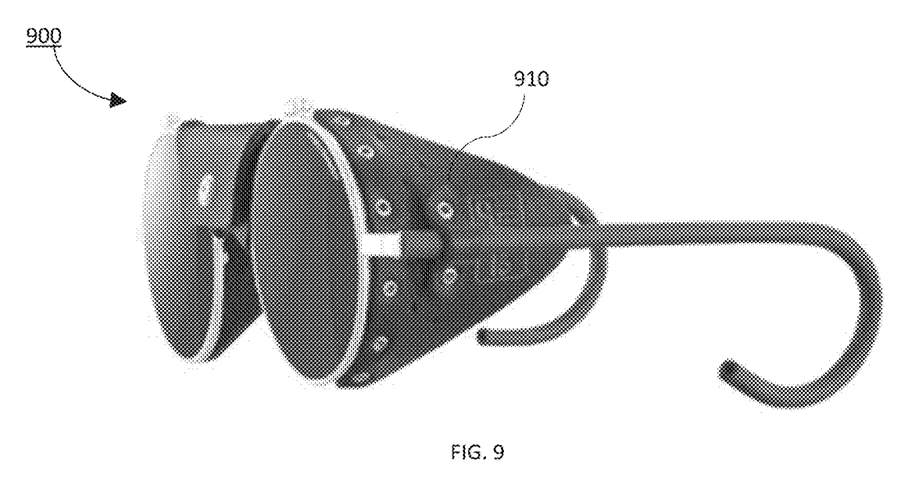
FIG. 9 shows an embodiment of eyeglasses featuring side-shielding for reducing backside reflection.

In some implementations, color perception enhancing eyeglasses can include additional features to control unwanted reflection associated with the spectral filters. Dichroic filters, for example, block certain wavelengths by reflecting light at those wavelengths. Typically, light at the blocked wavelengths incident on either side of the lens is reflected. Accordingly, one problem with dichroic filters is an undesired reflection of light incident from behind the wearer entering the wearer's eyes. Accordingly, eyeglasses can include additional features to reduce this effect. For example, in some embodiments, physical light stops can be used to physically block stray light originating from behind the wearer from reaching the back surface of the lens. Referring to FIG. 9, this can be done by shielding the sides of eyeglasses 900 using side shield 910 similar to that of glacier glasses or safety goggles, for example.

Figure 10:
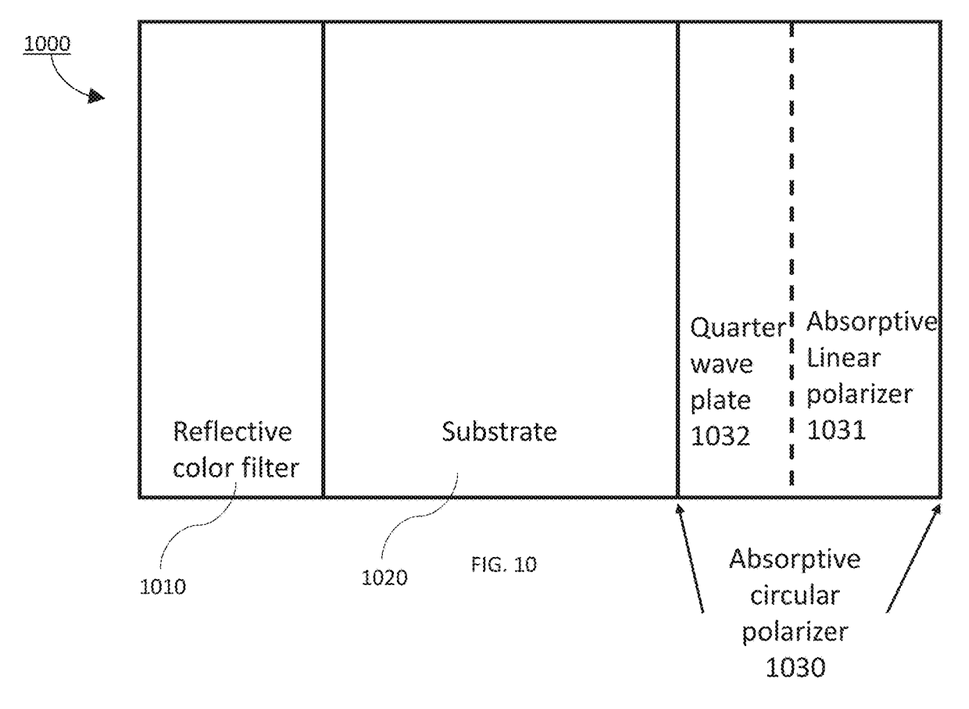
FIG. 10 shows a schematic cross-section of a lens of color-perception enhancing eyeglasses implementing a backside reflection reduction layer.

Referring to FIG. 10, another solution is to integrate an absorptive circular polarizer 1030, e.g., on the eye-facing surface of lens 1000 in combination with reflective color filter 1010 (e.g. dichroic filters) on the opposite surface. Absorptive circular polarizer 1030 includes an absorptive linear polarizer 1031 followed by quarter-wave plate 1032 with its fast or slow axis oriented at 45 degrees with respect to the transmission axis of the absorptive linear polarizer. The incident light entering from the front of the wearer passes first through the reflective color filter 1010, through the substrate 1020, then through the circular polarizer, first through the quarter-wave plate 1032, then through the linear polarizer 1031. Such configuration absorbs, nominally, 50% of the unpolarized incident light from the front of the lens. On the other hand, light entering from the backside of the lens first enters the circular polarizer through absorptive linear polarizer 1031 followed by quarter-wave plate 1032. The incident light at this point has lost nominally 50% of intensity, and has become circularly polarized. The circularly polarized light travels through the substrate 1020, and a certain spectral portion (corresponding to the block wavelengths of the filter) of this light is then reflected by the reflective filter on the front surface. This reflection changes the handedness of the circularly polarized light. The reflected light passes again through the substrate 1020, then enters the circular polarizer in reverse. During this propagation in the reverse direction, the quarter-wave plate converts the circularly polarized light back into linearly polarized light, but the resulting linear polarization is now 90 degrees rotated with respect to the linear polarizer's transmission axis due to the light's double-pass through the quarter-wave plate and the reversal of the handedness upon reflection. Therefore, the backward incident light is completely absorbed, eliminating the glare coming from behind the wearer.

While color-perception enhancing eyeglasses has been described, color-perception enhancing filter set can be implemented in other forms of eyewear, including contact lenses, intraocular lenses, and goggles.

In certain implementations, use of color-perception enhancing eyewear can include training the wearer by providing objects having colors selected to specifically correspond to the different spectral transmission characteristics of the filter set. For example, for the filter set shown in FIG. 3 above, the wearer can be trained using a first object that stimulates M' but not L', and a second object that stimulates L' but not M'. By viewing the two objects sequentially and/or simultaneously, and with knowledge of which is which, the wearer can train themselves to distinguish between the two different colors.

Spectral filters can also be formed using polarizers in conjunction with a dispersive birefringent material. For example, in some embodiments, a spectral filter can be formed by a pair of absorptive linear polarizers (e.g., iodine stained PVA based polarizers) separated by a layer of a dispersive birefringent material (e.g., a liquid crystal or birefringent polymer). In such structures, when illuminated with broadband, unpolarized light, the transmission spectrum depends on the amount of retardation experienced by each wavelength as it traverses the birefringent material and the relative orientation of the transmission axes of the two linear polarizers. The transmission spectrum can selected based on judicious selection of these parameters.

Spectral filters can also be formed using a wavelength-sensitive polarizer. For example, in some embodiments, a pair of crossed polarizer can be implemented using a wavelength-selective (e.g., dispersive) linear polarizer followed by a broadband linear polarizer. The wavelength-selective polarizer may have a polarization efficiency that varies over the wavelengths. Wavelengths that are efficiently polarized by the wavelength-selective polarizer are more effectively blocked relative to the wavelengths that are not polarized or less-efficiently polarized. For example, a first band of wavelengths that are efficiently polarized by the wavelength-selective polarizer may be efficiently filtered out by the crossed broadband linear polarizer, resulting in low transmission of the first band of wavelengths. As such, the transmission spectrum can selected based on judicious selection of the spectral response of the wavelength-selective linear polarizer.

In general, the spectral filters described above can be formed in a variety of different ways, depending on their composition. For example, in some embodiments, thin film deposition techniques can be used to form filters composed of dielectric multilayers on the surface of each lens. Various physical and/or chemical deposition processes can be used such as, for example, sputtering deposition methods, evaporation deposition methods (e.g., thermal, laser assisted, or electron beam evaporation), physical vapor deposition, chemical vapor deposition (e.g., plasma-enhanced CVD, atomic layer deposition). Commonly-used materials used for optical thin films include titanium oxide, silicon nitride, or silicon oxide, for example.

In some embodiments, filters can be formed separately and laminated onto a lens surface. For example, a laminate composed of a thin film stack can be formed separately and laminated to the lens surface using an adhesive. As another example, an absorptive color filter can be cast as a film and laminated onto the lens surface. For instance, films containing light absorbing dyes (e.g., commercially-available dyes, such as those sold by Epolin, Newark, NJ) can be formed using conventional film forming techniques (e.g., coating, casting, extruding) and then laminated onto a lens. Polarizing filters, such as those described above, can also be applied as laminate structures.

In some embodiments, films containing light absorbing dyes can be formed directly on a lens surface, e.g., by casting.

In certain embodiments, the lenses themselves can include materials that serve to spectrally filter light. For example, light absorbing dyes can be incorporated into the lens material.

Figure 11:
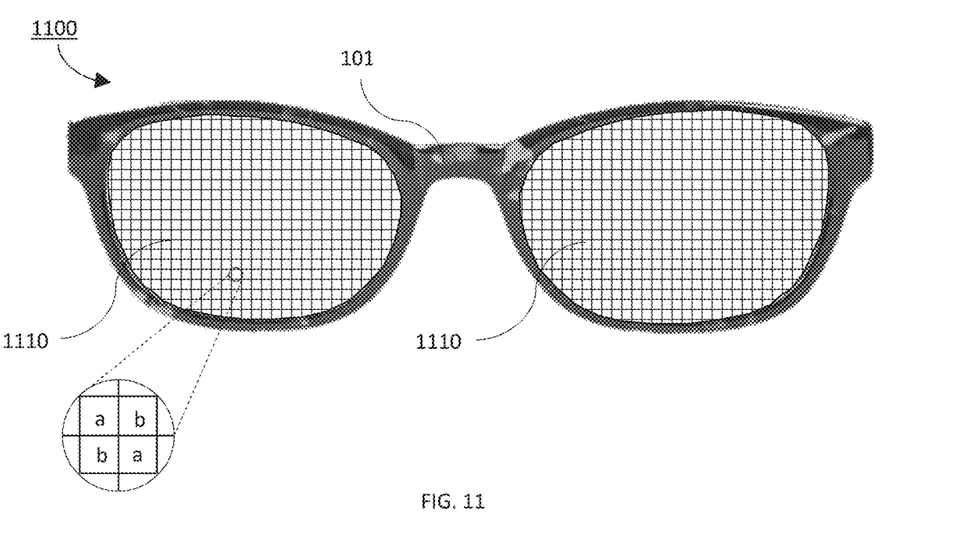
FIG. 11 shows a pair of eyeglasses that include spectral filter arrays for enhancing color perception.

In the foregoing embodiments, each of the user's eyes view their environment through a different spectral filter that covers their entire field of view of each lens. However, other implementations are also possible. For example, in some embodiments, more than one spectral filter can be used for each eye. Referring to FIG. 11, for instance, a pair of eyeglasses 1100, which includes frames 101, features lenses 1110 that each have a spectral filter array. Here, each array is composed of two different spectral filters, identified as filters a and filters b in the inset. Filters a, for example, can each be a long pass filter described above, while filters b can each be the corresponding short pass filter (see, e.g., FIGS. 3, 4, and 7A-B). Alternatively, filters a can each be a notch filter (see, e.g., FIG. 5A and FIG. 6A) while filters b are each a short-pass filter (see, e.g., FIG. 5B and FIG. 6B). In some embodiments, filters a are notch filters (see, e.g., FIG. 8A), while filters b are long pass filters (see, e.g., FIG. 8B).

Generally, the filter elements are sized so that discrete areas of the wearer's retina samples light from one of the filters, but collectively, the retina samples light from both types of filter. In some embodiments, the filters have an area in a range from about 1 mm$^2$ to about 50 mm$^2$ (e.g., about 2 mm$^2$ or more, about 5 mm$^2$ or more, about 10 mm$^2$ or more, such as about 40 mm$^2$ or less, about 25 mm$^2$ or less).

While filters a and b are shown as square filters in FIG. 11, more generally, other shapes are possible, e.g., rectangles, hexagons, etc. Furthermore, the size and shape of the filters in a filter array can vary. For example, smaller filter array elements can be used closer to the lens axis, while larger elements can be used closer to the lens periphery.

Spectral filter arrays can be formed using a variety of techniques. For example, masked deposition techniques can be used in order to deposit layers of differing thickness and/or composition on different areas of a lens surface. Other patterning techniques, such as printing techniques (e.g., ink jet printing) are also contemplated.

The above embodiments all feature passive spectral filters. In certain embodiments, however, dynamic spectral filters can be used. Generally, dynamic spectral filters are filters with an optical response that varies depending on some external stimulus. Electrically-switchable spectral filters, for instance, have optical properties that vary in response to an applied electric field. An electrically-switchable spectral filter may be implemented, for example, using liquid crystals. Photochromic spectral filters are also possible. Such filters have optical properties that vary depending on environmental light intensity (e.g., their properties may vary depending on whether it's daytime or nighttime). Mechanically-adjusted spectral filters are also possible, in which relative locations or orientations of one or more optical elements can be adjusted to control the optical response. For example, the relative orientation of two optical elements can be adjusted (e.g., polarization axes of a pair polarizers) to control the optical response. As another example, relative locations of two optical elements may be varied, or relative location or orientation (e.g., incidence angle) of the optical element with respect to the eye of the user may be varied to control the optical response.

Generally, the switchable optical property of a dynamic spectral filters can vary depending on the type of filter used. In some embodiments, the spectral band edges of the filter can vary in response to the stimulus. Alternatively, or additionally, dynamic spectral filters can switch between a first state in which they provide spectral filtering, and a second stage in which they exhibit the same transmission properties across the entire visible spectrum, i.e., they appear colorless.

Figure 12:
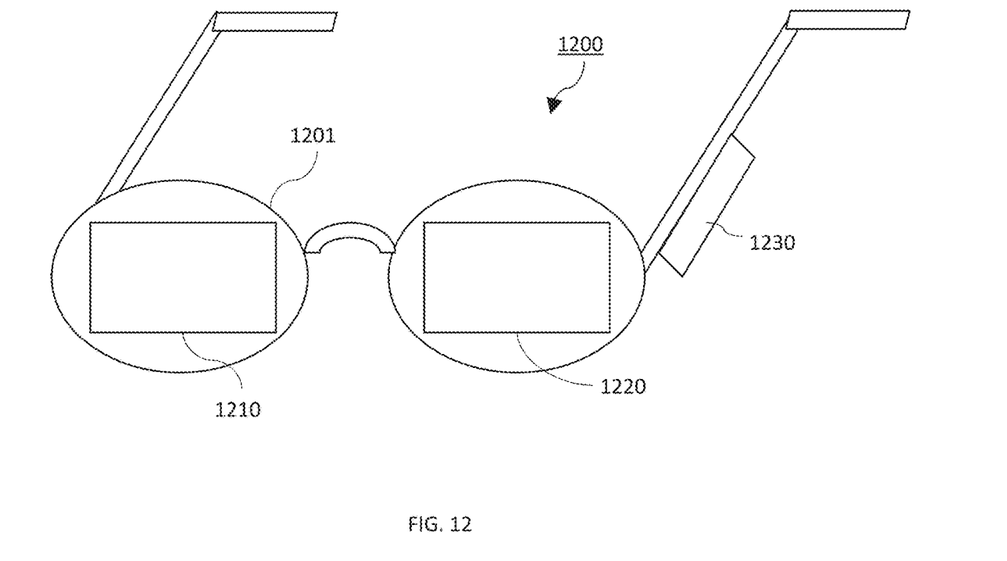
FIG. 12 shows a pair of eyeglasses that include dynamic spectral filters for enhancing color perception.

Referring to FIG. 12, a pair of eyeglasses 1200 includes a dynamic spectral filter (1210 and 1220) with each lens. Eyeglasses 1200 include frames 1201 that feature a filter controller 1230 attached to one of the frames' arms. Controller 1230 includes a power supply and control electronics in communication with dynamic filters 1210 and 1220, e.g., via an electrical connection, such as wire leads. During operation, controller 1230 directs electrical signals to each of the dynamic filters to control (e.g., vary) the spectral properties of each filter.

Generally, the spectral properties of dynamic filters 1210 and 1220 can be varied depending on one or more different external inputs, such as direct control from the user (e.g., using a control switch or other user interface), or in response to input from a sensor (e.g., a light intensity sensor, a spectral sensor, a proximity sensor, a GPS sensor, etc.). The sensor can be mounted on frames 1201 (e.g., incorporated in controller 1230) or can be separate. In some cases, separate sensors can be part of another device, such as a smartphone.

In some embodiments, a first optical sensor may be placed before the dynamic filters 1210 and 1220 (e.g., on the outer surface of the eyeglasses 1200 facing away from the user) and a second optical sensor may be placed after the dynamic filters 1210 and 1220 (e.g., on the inner surface of the eyeglasses 1200 facing the eye of the user). The first and second optical sensors can be used to measure the intensity and/or spectrum of the light before and after the dynamic filters 1210 and 1220. The pre-filter and post-filter spectra may be analyzed by the controller 1230 to dynamically control the spectral properties of the dynamic filters 1210 and 1220. For example, specific color recognition capabilities of the user of the eyeglasses 1200 may be taken into account by the controller 1230 in controlling the dynamic filters 1210 and 1220 to optimize the color perception of the user. As another example, illumination intensity or color temperature of a visual scene may be determined and dynamically compensated by the controller 1230. As yet another example, the controller 1230 may determine various scenes such as a monochromatic scene (e.g., a green field of grass) or a colorful scene, and adjust the dynamic filters 1210 and 1220 to optimize the color perception of the user.

In some embodiments, the spectral properties of the dynamic filters 1210 and 1220 can be varied in a set sequence to enhance color perception of the wearer. For example, the spectral characteristics of the filters 1210 and 1220 may be toggled between a first state and a second state at a set frequency. The frequency may be, for example, a frequency at which visual changes can be sufficiently perceived by the human vision (e.g., less than 24 Hz, less than 30 Hz). Such toggling may, under certain visual conditions, help the wearer differentiate colors as a perceived change in contrast, hue, saturation or color. In general, the toggling may be generalized to cycling through three or more states.

A variety of different technologies can be used for dynamic spectral filtering. For example, electrochromic or liquid crystal based spectral filters can be used. Electrically-switchable Bragg gratings, such as those formed used polymer-liquid crystal composites, can be used. In some embodiments, the dynamic spectral filters 1210 and 1220 may be implemented using mechanical actuation. For example, micro-motor mechanisms (e.g., micro voice coil) or piezoelectric actuators may be used to mechanically actuate the spectral filters 1210 and 1220 to dynamically vary the spectral properties of the filters.

In some embodiments, a manual mechanical adjustment mechanism may be implemented to provide various static adjustments. For example, the focus of the eyeglasses 1200 may be varied based on a mechanical adjustment mechanism by adjusting the relative location of optical elements of compound lenses of the eyeglasses 1200. As another example, overall transmissivity of the eyeglasses 1200 may be varied based on a mechanical adjustment of the alignment of the crossed polarizers.

EXAMPLE

Dichroic coated glass filters were obtained from Rosco (Stamford, CT). Specifically, the filters were filter #1065, 5401, and 5600. The filter specifications are included as Appendices I-III. Rosco #1065 is a short-pass filter with a cutoff around 550 nm, while #5401 and #5600 are long-pass filters with cutoffs around 550 nm and 580 nm, respectively.

Figure 13A:
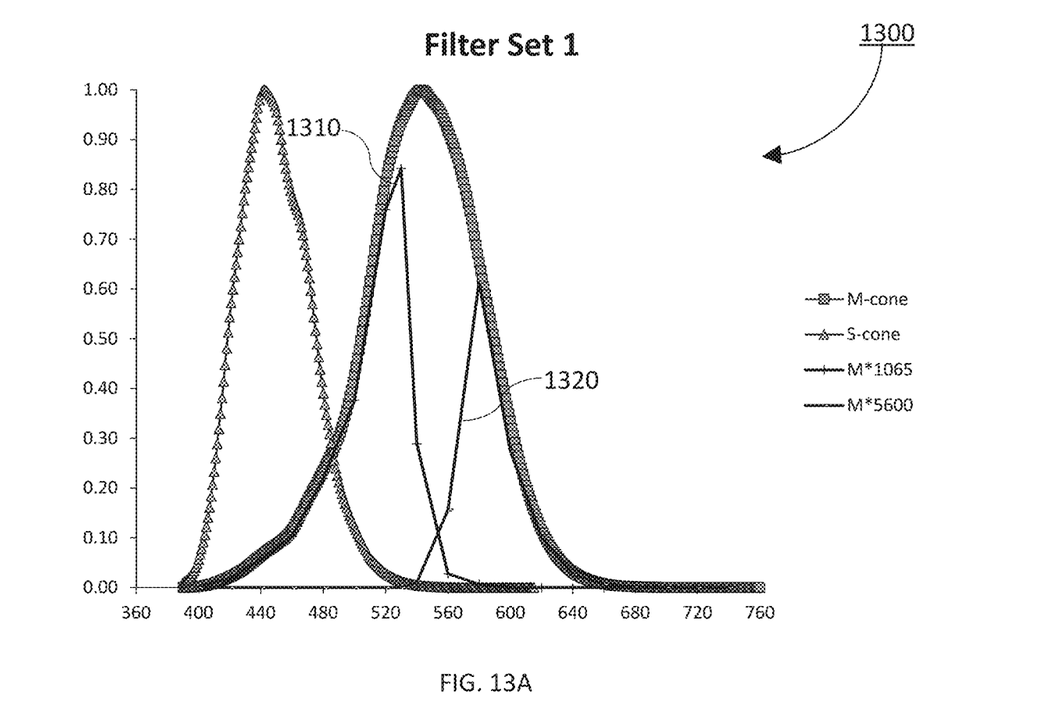
FIGS. 13A-B show examples of effective spectral responsivity curves of S- and M-cones as modified by color-perception enhancing lens implemented for a protanope.

The glass filters were cut into shape of a lens and fitted onto a pair of eyeglasses frames. The first filter set was Rosco #1065 and #5600, and the resulting modified M-cone responsivity curves 1310 and 1320 (corresponding to M'- and L'-cones, respectively) are shown in FIG. 13A.

Figure 13B:
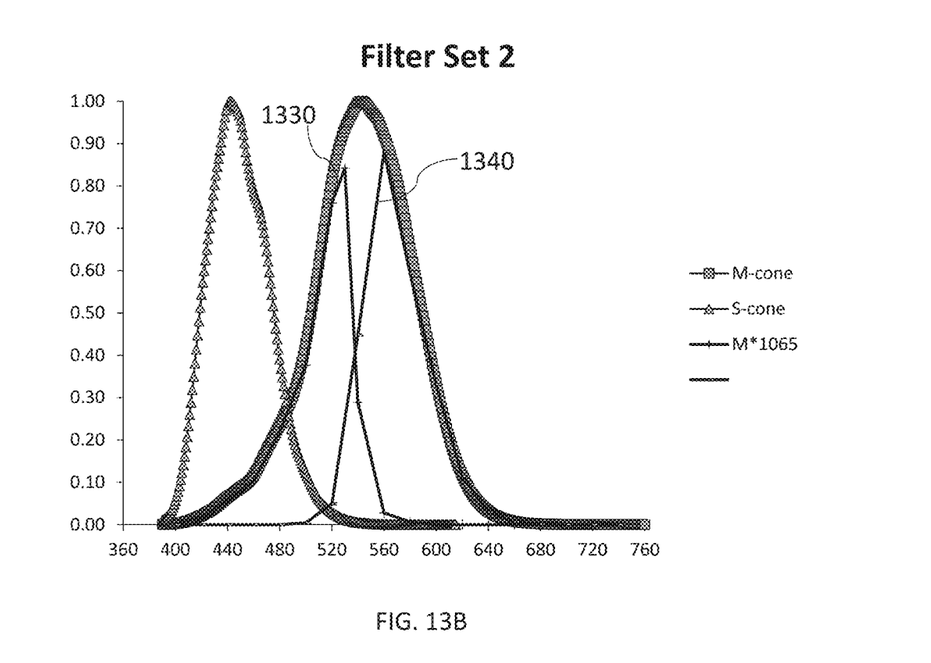

The second filter set was Rosco #1065 and #5641, and the resulting modified M-cone responsivity curves 1330 and 1340 (corresponding to M'- and L'-cones, respectively) are shown in FIG. 13B. Filter set 1 provided further separation of the peaks of M' and L' cones but larger difference in the relative peak responsivity, while filter set 2 provided less separation of the peaks but more balanced peak responsivity.

The subject (and inventor), a confirmed protanope, tested the glasses by observing different colored objects with and without the eyeglasses. The subject reported an enhanced perception of color that is described as 'shimmering' of color, color 'popping out', and color 'jumping out'. The subject also reported that filter set 2 provided better enhanced color-perception over filter set 1.

The subject was further tested using multiple widely-accepted pseudoisochromatic color vision tests, including the Cambridge Color Test, the Farnsworth D-15 test, and the Hardy Rand and Rittler (HRR) test. While the subject did not gain any apparent improvement in the Cambridge Color Test, substantial improvements in the result of the Farnsworth D-15 and the HRR color tests were observed.

Farnsworth D-15 test is one of the standard suite of tests used in evaluating color blindness. It involves having a subject order 15 block of different shades of color by picking the most similar color starting from a shade of blue. A metric named the color confusion index (CCI) is used to assess the severity of a color blindness condition. CCI is defined as the ratio of the measured Bowman's total color difference score (TCDS) of the test subject over the TCDS of a normal trichromat. See, e.g., Bowman KJ: A method for quantitative scoring of the Farnsworth panel D-15. *Acta Ophthalmol* 60:907, 1982. Therefore, a perfect normal trichromat would score 1.0, and a nominal dividing line between a normal and defective color vision is accepted to be 1.60. See, e.g., A. J.

Vingrys, P. E. King-Smith; A quantitative scoring technique for panel tests of color vision. *Invest. Ophthalmol. Vis. Sci.* 1988; 29(1):50-63.

The subject was tested by performing the test twice without the color-perception enhancing eyeglasses and scored a color confusion index of 2.51 on the first trial and 2.99 on the second trial. The subject was then tested with the eyeglasses, performing 5. On these tests, the subject scored 1.79, 1.82, 1.05, 1.19, and 1.38, in that order. The data displayed a clear improvement of the CCI, scoring below 1.60 of a normal color vision in three out the five trials. Upon further inspection of the data, a significant drop in CCI after the first two trials become apparent. The drop was attributed to the learning and adjustment by the inventor to the new perception enabled by the glasses. The subject learned the correct perception of color by learning the correct answers to his mistakes, and conditioning on that knowledge to improve his performance. Such conditioning and learning enabled the subject to score within the normal color vision threshold.

Similarly, the subject was able to significantly improve his performance in the HRR test from getting around 2-3 correct out of 14 to getting 8-9 out of 14 with practice using the eyeglasses.

A number of embodiments of the invention have been described. Nevertheless, it will be understood that various modifications may be made without departing from the spirit and scope of the invention. Accordingly, other embodiments are within the scope of the following claims.

What is claimed is:

1. An article, comprising:
    a first ophthalmic lens comprising a first spectral filter, an first absorptive linear polarizer, and a first quarter wave plate arranged between the first spectral filter and the first absorptive linear polarizer; and
    a second ophthalmic lens comprising a second spectral filter, an second absorptive linear polarizer, and a second quarter wave plate arranged between the second spectral filter and the second absorptive linear polarizer,
    wherein the first spectral filter substantially blocks visible light having wavelengths corresponding to a first portion of a spectral sensitivity range of a first type of cone and substantially passes visible light having wavelengths in a second, non-overlapping portion of the spectral sensitivity range, and
    the second spectral filter substantially blocks visible light having wavelengths in the second portion of the spectral sensitivity range and substantially passes visible light having wavelengths in the first spectral sensitivity range.

2. The article of claim 1, wherein the article is eyeglasses, a pair of contact lenses, goggles, or a pair of intraocular lenses.

3. The article of claim 1, wherein the first and second spectral filters are a low-pass filter and a high-pass filter, respectively.

4. The article of claim 1, wherein at least one of the first and second spectral filters is a notch filter.

5. The article of claim 1, wherein at least one of the first and second spectral filters substantially transmits visible light having wavelengths below 520 nm.

6. The article of claim 5, wherein both of the first and second spectral filters substantially transmits visible light having wavelengths below 520 nm.

7. The article of claim 1, wherein the first and second spectral filters are reflective spectral filters.

8. The article of claim 1, wherein the first and second spectral filters are absorptive spectral filters.

9. The article of claim 1, wherein the first and second spectral filters are passive spectral filters.

10. The article of claim 1, wherein the first and second spectral filters are dynamic spectral filters.

11. The article of claim 10, wherein the dynamic spectral filters each comprise an electro-optic element.

12. The article of claim 1, wherein at least the first ophthalmic lens further comprises a filter array comprising the first spectral filter.

13. The article of claim 12, wherein the second ophthalmic lens further comprises a filter array comprises the second spectral filter.

14. The article of claim 1, wherein a first transmission spectrum of the first spectral filter and a second transmission spectrum of the second spectral filter are configured to enhance the color perception of a dichromat.

15. A method of enhancing the color perception of a dichromat, comprising:
    providing the dichromat with the article of claim 1.

16. The method of claim 15, wherein the dichromat is a protanope and the first type of cone corresponds to an M-cone.

17. The method of claim 15, wherein the dichromat is a deuteranope and the first type of cone is an L-cone.

18. The method of claim 15, wherein the dichromat is a tritanope and the first type of cone is a S-cone.

* * * * *